United States Patent Office 3,397,173
Patented Aug. 13, 1968

3,397,173
STABLE CHLOROPRENE-SULFUR COPOLYMER
John Wilfred Collette, Wilmington, Del., and Robert William Keown, Londonderry, Northern, Ireland, assignors to E. I. du Pont de Nemours and Company, Wilmington, Del., a corporation of Delaware
No Drawing. Filed Mar. 10, 1964, Ser. No. 350,652
5 Claims. (Cl. 260—45.9)

ABSTRACT OF THE DISCLOSURE

A process improvement whereby stable, processable chloroprene-sulfur copolymers can be prepared by the polymerization of chloroprene and sulfur in an aqueous emulsion to form a latex from which the polymer is isolated; which improvement comprises (1) conducting said polymerization in the presence of (a) 0.25 to 0.45 part of sulfur, per 100 parts of monomer, and (b) an amount of dialkyl xanthogen disulfide equivalent to 0.25 to 0.45 part of diethyl xanthogen disulfide, said alkyl radicals having from 1 to 8 carbon atoms; and (2) adding to the latex at least 0.25 part, per 100 parts of polymer, of an antioxidant selected from the group consisting of secondary aromatic amines and phenolic antioxidants.

---

This invention relates to a stable, processable chloroprene-sulfur copolymer and its preparation.

The so-called "sulfur-modified" chloroprene polymers are highly useful and versatile elastomers which have won wide commercial acceptance. Actually, such polymers are chloroprene-sulfur copolymers since the sulfur is incorporated into the polymer chain in the form of sulfide linkages. The chloroprene can be polymerized to a high monomer conversion and the sulfide linkages can then be broken down to yield polymers of any desired viscosity. These sulfur-chloroprene copolymers have in the past been prepared by polymerizing chloroprene in an aqueous emulsion in the presence of sulfur, as described, for example, in Whitby, "Synthetic Rubber," 1954, page 770. After the polymerization has reached the desired stage, an emulsion of tetraethylthiuram disulfide is introduced to plasticize the polymer by cleaving the sulfur linkages present in the polymer. In spite of the wide commercial acceptance of these elastomers, they have a number of disadvantages. The principal disadvantage is their limited storage stability because of the presence in the composition of the tetraethylthiuram disulfide. The viscosity of the polymer gradually changes during the period between manufacture and use, and eventually the polymer will become unsatisfactory for use. This instability has necessitated costly refrigeration during shipment and storage to minimize deterioration. In spite of such precautions, it has also necessitated the use of polymer within a limited period of time. This represents an economic loss to the supplies of the product, who some times finds it necessary to replace unsatisfactory lots of product.

It is extremely desirable to be able to prepare a chloroprene polymer which retains the desirable features imparted by the sulfide linkages in the chloroprene-sulfur copolymer, but which polymer will be processable and stable against changes in processability during storage and aging.

It would seem that, if the instability is caused by the presence in the composition of the tetraalkylthiuram disulfide, the problem could be solved merely by leaving out the plasticizing agent. However, the high-conversion chloroprene-sulfur copolymers, before treatment with the plasticizing agent, are intractable and cannot be handled on standard rubber processing equipment.

U.S. Patent 2,234,215 teaches that a plastic polymer product results directly when chloroprene is polymerized in the presence of sulfur and of a variety of compounds such as the mercaptans, the dixanthogens, the bisthioxanthogens, and the aromatic polysulfides. However, it is not evident from this teaching how to prepare a chloroprene-sulfur copolymer having satisfactory processability which polymer will also be stable with respect to changes in processability. For example, the aliphatic mercaptans, often used as modifying agents in diene polymerizations, cannot satisfactorily be used in the presence of sulfur, particularly in the preferred alkaline polymerization system. U.S. Patent 1,950,439 discloses the polymerization in the presence of both sulfur and thiuram disulfides. The thiuram disulfides are inhibitors of polymerization so so that polymerization cannot be taken above about 74 percent monomer conversion. Also, polymers prepared in the presence of both sulfur and tetraethylthiuram disulfide do not have the desired stability with respect to changes in viscosity on storage.

It has been unexpectedly found that chloroprene-sulfur copolymers can be produced which are both easily processed and which are highly stable against undesirable changes in viscosity by a process which comprises polymerizing chloroprene in aqueous emulsion in the presence of from 0.25 to 0.45 part of sulfur, per 100 parts of monomer, and an amount of dialkyl xanthogen disulfide equivalent to 0.25 to 0.45 part of diethyl xanthogen disulfide, the dialkyl xanthogen disulfide having from 1 to 8 carbon atoms in each alkyl radical. At least 0.25 part, per 100 parts of polymer, of antioxidant is added to the resulting latex to stabilize the polymer against changes in processability.

In carrying out the process of this invention up to about 50% by weight of the chloroprene monomer can be replaced with another monomer containing olefinic unsaturation which is copolymerizable with the chloroprene. Satisfactory monomers copolymerizable with chloroprene include those compounds containing the group $CH_2=C<$ of the following representative types: vinyl-substituted aromatic compounds such as styrene, vinyltoluenes, and vinylnaphthalenes; acrylic and methacrylic acids and derivatives thereof such as esters and nitriles, e.g., methyl methacrylate and acrylonitrile; and conjugated diolefinic compounds such as 1,3-butadiene, isoprene, and 2,3-dichloro-1,3-butadiene. Throughout this specification, the term "monomer" refers to total organic monomer used; the sulfur is not included in the monomer weight.

The polymerization is carried out in aqueous emulsion using any of the conventional free-radical polymerization catalysts. These include alkali metal or ammonium ferricyanides and peroxy compounds such as alkali metal or ammonium persulfates, hydrogen peroxide, cumene hydroperoxide, and dibenzoyl peroxide.

Any of the conventional emulsifying agents may be used in preparing the monomer emulsion. These include the water-soluble salts, particularly the sodium, potassium, or ammonium salts, of compounds of the following types: long-chain fatty acids; rosins or rosin derivatives, such as wood rosin, tall oil rosin, disproportionated rosin, or partially polymerized rosin; higher alcohol sulfates; arylsulfonic acids, such as nonylbenzenesulfonic acid; and formaldehyde condensates of arylsulfonic acids, such as the condensation product of formaldehyde and naphthalene sulfonic acid.

The concentration of organic monomer present in the aqueous emulsion is not critical. In general, 30 to 60 percent, by weight, based on the total weight of the emulsion, is the range of concentrations of organic monomer used in the preparation of the polymer.

It is preferred to use pH's in the alkaline ranges, as is customary in the preparation of sulfur-chloroprene copolymers.

The polymerization may be carried out between 0° C. and 80° C., preferably between 40° and 50° C.

Polymerization is carried out in an inert atmosphere free of oxygen, such as an atmosphere of nitrogen or other inert gas.

The percent of monomer conversion is not critical. For economic reasons, it is preferred that polymerization be carried out to at least 85 percent monomer conversion. If desired, conversion can be taken to 100 percent.

Polymerization may be stopped at any desired point by use of conventional "short-stopping" agents such as are disclosed in U.S. Patent 2,576,009. After polymerization is complete or has been stopped, an antioxidant is added to the latex. This will be discussed in more detail later. Any unreacted monomer may be removed by known methods, such as by steam stripping as disclosed in U.S. Patent 2,467,769.

The polymer is isolated by conventional methods such as are described in U.S. Patents 2,187,146 and 2,914,497.

The dialkyl xanthogen disulfides which may be used in practicing this invention have the general formula

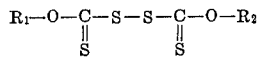

in which $R_1$ and $R_2$ are alkyl groups containing one to eight carbon atoms. Examples of suitable compounds are dimethyl xanthogen disulfide, diethyl xanthogen disulfide, diisopropyl xanthogen disulfide, the dibutyl xanthogen disulfides, and bis(2-ethylhexyl)xanthogen disulfide. The preferred compounds are those in which the alkyl groups contain 2 to 4 carbon atoms.

The amounts of sulfur and of the dialkyl xanthogen disulfide are critical in preparing a chloroprene-sulfur copolymer of satisfactory processability. If too much sulfur is used, the polymer rapidly breaks down during processing in the presence of a peptizing agent to an unusable level of viscosity. If too little sulfur is used, the desirable features of the chloroprene-sulfur copolymer are lost; that is, the polymer cannot be plasticized to the desired degree. The operable range of sulfur to be used in practicing this invention ranges between 0.25 and 0.45 part by weight per 100 parts of organic monomer. These ranges of sulfur, however, produce polymers of satisfactory processability only when the polymerization system also contains a dialkyl xanthogen disulfide in the range defined under the definition. The amount of the different dialkyl xanthogen disulfides will vary somewhat with the molecular weight. However, for an unknown reason, there are small differences in modifying effectiveness among molecularly equivalent amounts of various dialkyl xanthogen disulfides. For this reason, the amount of dialkyl xanthogen disulfide has been defined in terms of the effective amount of diethyl xanthogen disulfide, which effective amount ranges from 0.25 to 0.45 part by weight per 100 parts of organic monomer. To determine the amounts of other dialkyl xanthogen disulfides equivalent to these amounts of diethyl xanthogen disulfide, one may, for example, plot the Mooney viscosities of polymers prepared in the presence of varying amounts of a particular dialkyl xanthogen disulfide while the amount of sulfur is kept constant. From this chart the amount of a given dialkyl xanthogen disulfide may be related to the equivalent amount of diethyl xanthogen disulfide. For example instead of 0.25 to 0.45 part of diethyl xanthogen disulfide, one may use about 0.35 to 0.58 part of diisopropyl xanthogen disulfide.

It is essential that an antioxidant be added to the chloroprene-sulfur copolymer before isolation. This is conveniently done by adding the antioxidant to the latex along with the short-stopping emulsion containing polymerization arresters such as phenothiazine, 4-tert-butylcatechol, 2,6-di-tert-butylhydroquinone, etc. At least 0.25 part by weight of antioxidant should be added per 100 parts of polymer. The preferred amount ranges from 0.5 to 1 part. There is usually no advantage to be gained in adding any more than 2 parts of antioxidant. While the short-stopping system normally contains a small amount of an antioxidant, the amount used is not sufficient to produce stabilization of viscosity of the isolated polymer.

Any secondary aromatic amine antioxidant or any phenolic antioxidant well known in the art may be used. Examples of suitable antioxidants include N-phenyl-1-naphthylamine, N-phenyl-2-naphthylamine, N,N'-diphenyl-p-phenylenediamine, alkylated diphenylamines, such as octylated or nonylated diphenylamines, p-isopropoxydiphenylamine, di-2-naphthyl-p-phenylenediamine, N-phenyl - N' - (p-toluenesulfonyl)-p-phenylenediamine, 2,2'-methylenebis(6-tert-butyl-p-cresol), 2,2'-methylenebis(6-tert - 4 - ethylphenol), 4,4'-butylidenebis(6-tert-butyl-p-tert cresol), 2,2'-methylenebis[(6-(1-methylcyclohexyl))-p-cresol], 2,6-di-tert-butyl-4-phenylphenol, 4,4'-thiobis(6-tert-butyl-m-cresol), 4,4'-thiobis(3,6-di-sec-amylphenol), 2,2'-thiobis(6-tert-butyl-p-cresol), 2,2'-thiobis(4,6-di-tert-butylphenol), 2,5-di-tert-amylhydroquinone, 4-benzyloxyphenol), p-lauroylaminophenol, p-stearoylaminophenol, 2,6-di-tert-butyl-α-dimethylamino-p-cresol, 2,4,6-tris(3,5-di-tert-butyl-4-hydroxybenzyl)mesitylene and 2,4,6-tris-(dimethylaminomethyl)phenol.

The chloroprene-sulfur copolymers prepared according to this invention may be subsequently compounded, cured and fabricated following general procedures for other types of chloroprene polymers. See, for example, Murray and Thompson, "The Neoprenes," Elastomer Chemicals Department, E. I. du Pont de Nemours and Co., 1963. Since the copolymers contain no plasticizing agent, as do the conventional "G types" of polychloroprene, the plasticity of the polymers may be increased, if desired, by milling with conventional plasticizing agents such as alkyl or aryl mercaptans and thiuram disulfides. Tetraalkylthiuram disulfides not only serve as peptizing agents but increase the processing safety and act as accelerators for the cure. It has been found that diisopropyl xanthogen disulfide is, unexpectedly, superior to tetraalkylthiuram disulfides in that it serves as an effective peptizing agent and, in black stocks, produces cured polymers having exceptionally high tensile strength. The diisopropyl xanthogen disulfide itself may be used or it may be used as a mixture with a diluent such as calcium silicate. Effective amounts of diisopropyl xanthogen disulfide range from about 0.5 part to 4 parts, by weight, per 100 parts of a polymer, with one to two parts preferred. More than 4 parts will excessively retard the cure and less than 0.5 part is not sufficient to effect peptization of the copolymer. The diisopropyl xanthogen disulfide may be compounded with other peptizing agents, plasticizers, accelerators, fillers, extenders, etc., commonly used in processing chloroprene polymers.

This invention will now be described in and by the following examples of specific embodiments thereof wherein all parts and percentages are by weight unless otherwise indicated.

EXAMPLE 1

Three polymers, 1A, 1B, and 1C, are prepared using the following recipe:

| | Parts |
|---|---|
| Chloroprene | 98 |
| 2,3-dichloro-1,3-butadiene | 2 |
| Sulfur | 0.4 |
| Rosin | 4 |
| Diethyl xanthogen disulfide, as shown in table I. | |
| Water | 115.5 |
| Sodium hydroxide | 0.75 |
| Sodium salt of condensate of formaldehyde and naphthalene-sulfonic acid | 0.5 |

An emulsion is prepared containing the above-listed ingredients. The polymerization is carried out at 40° C.

in a vessel from which the oxygen has been removed and replaced with an atmosphere of nitrogen. The catalyst is an aqueous solution containing, by weight, 5 percent of potassium persulfate and 0.125 percent of sodium 2-anthraquinonesulfonate. Polymerization is carried out to an 85 percent monomer conversion and is arrested by addition of an emulsion containing 0.017 part of 4-tert-butylcatechol, 0.017 part of phenothiazine, and, except for one sample, 0.5 part of an antioxidant as shown in the table. The unreacted monomer is removed by turbannular steam stripping as described in U.S. Patent 2,467,769. The latex is acidified with acetic acid to a pH of 5.5–6 and the polymer is isolated on a freeze roll as described in U.S. Patent 2,187,146.

For comparative purposes a polymer of a conventional type (designated as Polymer 1D) is prepared using the following recipe:

| | Parts |
|---|---|
| Chloroprene | 98 |
| 2,3-dichloro-1,3-butadiene | 2 |
| Sulfur | 0.6 |
| Rosin | 4 |
| Water | 136.1 |
| Sodium hydroxide | 0.75 |
| Sodium salt of condensate of formaldehyde and naphthalene-sulfonic acid | 0.5 |
| Copper (as $CuSO_4$) | 0.00004 |

Polymerization is carried out at 40° C. in an atmosphere of nitrogen using as catalyst solution a 5 percent aqueous solution of potassium persulfate containing 0.125 percent sodium 2-anthraquinonesulfonate. Polymerization is stopped at about 90 percent conversion by adding an emulion containing, per 100 parts of monomers, 0.45 part of tetraethylthiuram disulfide and 0.11 part of 2,6-di-tert-butyl-4-phenylphenol, and a solution containing sodium dibutyldithiocarbamate (0.52 part per 100 parts of monomers). After polymerization has stopped, the latex is aged for about 6 hours at 27° C. Unreacted monomer is then stripped off. An additional amount of emulsion is added to provide 1.6 part of tetraethylthiuram disulfide and 0.39 part of 2,6-di-tert-butyl-4-phenylphenol. The latex is acidified to a pH of about 5.7 by the addition of acetic acid, and the polymer is isolated on a freeze roll.

All polymers are evaluated by measuring the Mooney viscosities of the freshly isolated polymers and of samples which have been stored at 38° C. after periods of three months and six months, respectively. Viscosity measurements are made at 100° C. by ASTM Method D–1646–61 using the large rotor (ML 1+2.5).

Another criterion used in evaluating the processability of the polymers is their safety in processing. To measure this, a sample of the polymer is compounded and the scorchiness of the stocks is measured at 121° C. by ASTM Method D–1646–61 using the small rotor. The scorch time is taken as the minutes required for a ten-point rise in viscosity over the minimum viscosity. Measurements are made on freshly compounded samples and on samples stored at 38° C. for three months and six months after compounding. The recipe used in compounding the stocks is as follows:

| | Parts |
|---|---|
| Polymer | 100 |
| Tetraethylthiuram disulfide | 2 |
| Diphenylguanidine | 0.25 |
| N-phenyl-1-naphthylamine | 2 |
| Magnesia | 4 |
| Stearic acid | 0.5 |
| Medium thermal carbon black | 100 |
| Light process oil | 10 |
| Zinc oxide | 5 |
| 2-mercapto-2-imidazoline | 0.25 |

Compounding is carried out on a cool mill (25–30° C.) adding the ingredients in the order listed. No tetraethylthiuram disulfide, diphenylguanidine, or 2-mercapto-2-imidazoline is added to the conventional polymer designated as Polymer 1D. This polymer already contains the thiuram and the other agents are not required for the cure. Their presence would increase the scorchiness of the stock; therefore, the comparison in scorchiness shown in the table represents conditions favorable to comparative Polymer 1D.

To show the effect of processing on the Mooney viscosity of the compounded stock, this data has also been included.

Typical test results are shown in Table I.

TABLE I

| Polymer | 1A | 1B | 1C | 1D |
|---|---|---|---|---|
| Parts of Diethyl Xanthogen Disulfide in Recipe | 0.37 | 0.38 | 0.40 | None |
| Antioxidant | (1) | (2) | (3) | (2) |
| Raw Polymer Viscosity: | | | | |
| Original | 74.5 | 71 | 68.5 | 46 |
| After Aging at 38° C.: | | | | |
| 3 months | 85 | 73 | 80 | 32 |
| 6 months | 88 | 82 | 91.5 | 30 |
| Scorch Time, Minutes to 10-Point Rise: | | | | |
| Original | 37 | 40 | 37.5 | 45+ |
| After Aging at 38° C.: | | | | |
| 3 months | 31 | 42.5 | 40 | 35+ |
| 6 months | 12 | 42.5 | 42 | 14.5 |
| Compounded Polymer Viscosity: | | | | |
| Original | 50.5 | 49 | 48 | 39 |
| After Aging at 38° C.: | | | | |
| 3 months | 51.5 | 48.5 | 48.5 | 33 |
| 6 months | 65 | 50.5 | 52.5 | 37.5 |

¹ No antioxidant (comparison).
² 2,6-di-tert-butyl-4-phenylphenol.
³ N-phenyl-1-naphthylamine.

From the above data it can be seen that the viscosity of the conventional polymer (Polymer 1D) is undesirably low and decreases even more on aging. An uncompounded polymer having a Mooney viscosity of 30–32 is very sticky on the mill and is therefore difficult to use. Furthermore after six months, the scorch time of compounded Polymer 1D, even without diphenylguanidine and 2-mercapto-2-imidazoline, is only 14.5 minutes, which means that it would be difficult to use the polymer safely in factory equipment. On the other hand, Polymers 1A, 1B, and 1C have satisfactory Mooney viscosities and these values do not show a drop during aging. On the contrary, the polymers show a slow increase in viscosity. The sample containing the phenolic antioxidant (Polymer 1B) shows the smallest increase in viscosity. However, Polymer 1A, to which no antioxidant was added with the short-stop emulsion, shows a significant decrease in processing safety on aging. After six months the scorch time of Polymer 1A is only 12 minutes whereas Polymers 1B and 1C show no loss in processing safety.

Example 2

This experiment is designed to show the unique advantages of the use of a dialkyl xanthogen disulfide as compared with tetraethylthiuram disulfide, which latter compound is disclosed in the prior art to be a modifying agent.

Polymerizations are carried out essentially as described in Example 1 using the following recipe:

| | Parts | |
|---|---|---|
| Polymer | 2A | 2B |
| Chloroprene | 100 | 100 |
| Sulfur | 0.4 | 0.4 |
| Nancy Wood Rosin | 4 | 4 |
| Diethyl Xanthogen Disulfide | 0.32 | |
| Tetraethyl Thiuram Disulfide | | 0.45 |
| Water | 115.5 | 115.5 |
| Sodium Hydroxide | 0.5 | 0.5 |
| Sodium salt of Condensate of Formaldehyde and Naphthalene-sulfonic Acid | 0.75 | 0.75 |

The catalyst solution is an aqueous solution containing 5 percent potassium persulfate and 0.125 percent sodium 2-anthraquinonesulfonate. Polymeriztaion is carried out at 40° C. in an atmosphere of nitrogen. In system 2B, polymerization is inhibited by the thiuram disulfide so that conversion does not go beyond 74 percent. Therefore, to get a polymer of similar viscosity, polymerization in system 2A is stopped at 80 percent conversion. To each system is added a stabilizer emulsion containing 0.017 part of phenothiazine, 0.017 parts of 4-tert-butyl-catechol, and 0.5 part of 2,6-di-tert-butyl-4-phenylphenol. Unreacted monomer is removed, and the polymers are isolated as described in Example 1.

The viscosities are measured when the polymers are freshly isolated and after they have been stored at 50° C. for one, three weeks and five weeks. Mooney scorch time is measured as described in Example 1 on freshly compounded stock and on samples after aging at 50° C. for 3 weeks and 5 weeks. Table II shows typical test data.

TABLE II

| Polymer | 2A | 2B |
|---|---|---|
| Modifier | (1) | (2) |
| Viscosity: | | |
| Original | 75 | 73 |
| Aged at 50° C.: | | |
| 1 week | 71 | 81 |
| 3 weeks | 71 | 107 |
| 5 weeks | 76 | 117 |
| Scorch Time, Minutes to 10-Point Rise: | | |
| Original | 45+ | 40 |
| After aging at 50° C.: | | |
| 3 weeks | 42 | 27 |
| 5 weeks | 40 | 26 |

1 Diethyl xanthogen disulfide.
2 Tetraethyl thiuram disulfide.

From the above data it can be seen that Polymer 2B prepared in the presence of sulfur and tetraethyl thiuram disulfide (outside the scope of the invention) shows a significant change in viscosity and scorch after only three weeks, whereas Polymer 2A prepared in the presence of the xanthogen disulfide shows no significant change in viscosity or scorch during the 5-week period. Note that both samples contain the antioxidant.

Example 3

Samples of polymer are prepared using the same recipe and conditions as used in making Polymers 1A–C in Example 1 except that the diethyl xanthogen disulfide is replaced by diisopropyl xanthogen disulfide. In preparing Polymer 3A of this example two charges are made, one using 0.485 part of the xanthogen disulfide and one using 0.500 part. The two lots are then combined. Polymer 3B is prepared using 0.500 part of diisopropyl xanthogen disulfide. In preparing Polymer 3A the polymerization is stopped the same as in Polymer 1A of Example 1 (added antioxidant omitted) and in preparing Polymer 3B, 0.5 part of 2,6-di-tert-butyl-4-phenylphenol is contained in the emulsion added to arrest polymerization (as in Polymer 1B of Example 1).

The stability of the polymers is evaluated essentially as described in Example 1. Typical test results are shown in Table III.

TABLE III

| Sample | 3A | 3B |
|---|---|---|
| Antioxidant Added to Short-stop Emulsion | None | (1) |
| Mooney Viscosity of Raw Polymer: | | |
| Original | 83 | 88 |
| After 12 weeks at 38° C | 71 | 88 |
| After 16 weeks at 38° C | 78.5 | 80 |
| Mooney Viscosity of Compounded Stock: | | |
| Original | 48 | 50 |
| After 12 weeks at 38° C | 51 | 44 |
| After 16 weeks at 38° C | 70 | 44 |
| Mooney Scorch, Minutes to 10-Point Rise: | | |
| Original | 36 | 35 |
| After 12 weeks at 38° C | 18.5 | 44 |
| After 16 weeks at 38° C | 16 | 40 |

1 2,6-di-tert-butyl-4-phenylphenol.

From the above data it can be seen that after 12 weeks at 38° C., Polymer 3A does not possess satisfactory safety in processing, whereas Polymer 3B, made in accordance with this invention, shows excellent processing safety after 16 weeks at 38° C.

Example 4

This example demonstrates the effect of varying amounts of sulfur in the polymerization recipe.

Two polymers are prepared essentially as described in Example 1 using the following recipes:

| | Parts | |
|---|---|---|
| | 4A | 4B |
| Chloroprene | 100 | 100 |
| 2,3-dichloro-1,3-butadiene | 2 | 2 |
| Sulfur | 0.4 | 1 0.5 |
| Rosin | 4 | 4 |
| Diisopropyl Xanthogen Disulfide | 0.525 | 0.525 |
| Water | 115.5 | 115.5 |
| Sodium Hydroxide | 0.75 | 0.75 |
| Sodium Salt of Condensate of Formaldehyde and Naphthalenesulfonic Acid | 0.5 | 0.5 |

1 Note that this is in excess of the amount recommended and, therefore, outside the scope of this invention.

Catalyst, polymerization conditions and methods of isolation are similar to those used for Polymers 1A–C of Example 1. For this study no added antioxidant is included in the short-stop emulsion since, as can be seen from Example 1, the presence of the antioxidant does not significantly affect the original Mooney viscosity of the raw or compounded polymers.

The stock is compounded using the following recipe:

| | Parts |
|---|---|
| Polymer | 100 |
| Tetraethylthiuram disulfide | 1.25 |
| Tetramethylthiuram monosulfide | 1 |
| Di-o-tolylguanidine | 1 |
| Semi-reinforcing furnace black | 29 |
| Magnesia | 4 |
| Zinc oxide | 5 |

The following table shows typical original Mooney viscosities of the raw polymers and of the freshly compounded stock:

| Polymer | 4A | 4B |
|---|---|---|
| Parts of Sulfur Used in Polymerization | 0.4 | 0.5 |
| Mooney Viscosity of the Raw Polymer | 70 | 72 |
| Mooney Viscosity of the Compounded Stock | 28 | 15 |

From the above data it can be seen that Polymer 4B in which 0.5 part of sulfur is used in the polymerization (i.e., outside the invention) yields a compounded stock having an undesirably low Mooney viscosity. On the other hand, Polymer 4A in which only 0.4 part of sulfur is used (i.e., in accordance with the invention) yields a compounded stock of satisfactory Mooney viscosity. (A Mooney viscosity of 28 is satisfactory for a compounded stock and is nearly twice the value of the viscosity when 0.5 part of sulfur is used in the polymerization.)

Example 5

This example demonstrates the advantage of using diisopropyl xanthogen disulfide as a processing agent for the polymers of this invention.

The polymer used is prepared in the same way as Polymer 3B in Example 3, except that 0.35 part of diethyl xanthogen disulfide is used in the polymerization recipe. The polymer is then compounded using the following recipe:

| | Parts |
|---|---|
| Polymer | 100 |
| Processing agent (as shown) | 2 |
| Diphenylguanidine | 0.25 |
| N-phenyl-1-naphthylamine | 2 |
| Magnesia | 4 |
| Stearic acid | 0.5 |
| Medium thermal carbon black | 100 |
| Process oil | 10 |
| Zinc oxide | 5 |
| 2-mercapto-2-imidazoline | 0.25 |

Three samples of the stock (5A, 5B, and 5C) are cured in a mold under pressure at 153° C. for 30 minutes. Stress-strain properties are measured by ASTM Method D-412-61T. The processing agent used in the various samples is as follows:

Sample:                                                            Processing agent 5A           Diisopropyl xanthogen disulfide.
5B           A mixture of 75% diisopropyl xanthogen disulfide and 25% calcium silicate. 2.7 parts of the mixture to provide 2 parts of the xanthogen disulfide.
5C           Tetraethylthiuram disulfide.

The stress-strain data are as follows:

| Sample | 5A | 5B | 5C |
|---|---|---|---|
| Modulus at 300% Elongation, p.s.i. | 1,675 | 1,700 | 1,275 |
| Tensile Strength at Break, p.s.i. | 1,775 | 1,775 | 1,400 |
| Elongation at Break, Percent | 395 | 410 | 520 |

The above data show that stocks 5A and B in which the diisopropyl xanthogen disulfide is used in the recipe yield cured products having exceptionally good tensile strength and higher modulus than stock 5C prepared using tetraethylthiuram disulfide.

The chloroprene-sulfur copolymers prepared in accordance with this invention show excellent processability and stability as indicated by the following criteria:

(a) The raw polymer is of sufficiently low viscosity that it can be handled on normal rubber processing equipment such as mills or internal mixers but is of sufficiently high viscosity that it does not become excessively sticky during such processing. To meet this criterion, the Mooney viscosity values (ML 1+2.5) of the raw copolymers must fall within the range of 60–120, and preferably in the range 70–100. (The determination of Mooney viscosity is described in Example 1.)

(b) The polymers show little tendency towards premature vulcanization (scorching) during processing. This criterion is measured in terms of Mooney scorch times as described in Example 1.

In addition to having exceptionally good processability, the polymers prepared in accordance with this invention maintain their processability for extended periods of time.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. A stable, processable chlorophene-sulfur copolymer prepared by a process which comprises (1) polymerizing chloroprene and sulfur in an aqueous emulsion to form a latex in the presence of (a) 0.25 to 0.45 part of sulfur, per 100 parts of monomer and (b) an amount of dialkyl xanthogen disulfide equivalent to 0.25 to 0.45 part of diethyl xanthogen disulfide, said alkyl radicals having from 1 to 8 carbon atoms; and (2) adding to the latex at least 0.25 part, per 100 parts of polymer, of an antioxidant selected from the group consisting of 2,2'-methylenebis-(6-tert-butyl-p-cresol), 2,2'-methylenebis(6-tert-butyl-4-ethylphenol), 4,4'-butylidene-bis(6-tert-butyl-p-cresol), 2,2'-methylenebis(6-(1-methylcyclohexyl)-p-cresol), 2,6-di-tert-butyl-4-phenylphenol, 4,4'-thiobis-(3,6-di-sec-amylphenol), 4,4'-thiobis(6-tert-butyl-n-cresol), 2,2' - thiobis- (6 - tert - butyl - p - cresol), 2,2'-thiobis(4,6-di-tert-butylphenol), 2,5 - di - tert - amylhydroquinone, 4-benzyloxyphenol, p-lauroylaminophenol, p-stearoylaminophenol, 2,6-di-tert-butyl-α-dimethylamino-p-cresol, 2,4,6-tris(3,5-di-tert-butyl-4-hydroxybenzyl)mesitylene, and 2,4,6-tris-(dimethyl-aminomethyl)phenyl, and (3) isolating the polymer from the latex.

2. A copolymer as defined in claim 1 wherein said alkyl groups contain from 2 to 4 carbon atoms.

3. A copolymer as defined in claim 1 wherein said antioxidant is 2,6-di-tert-butyl-4-phenylphenol.

4. A copolymer as defined in claim 1 wherein 2,3-dichloro-1,3-butadiene is present in said polymerization in an amount up to about 50% of the total weight of monomers.

5. The cured, compounded chloroprene-sulfur copolymer which comprises the copolymer of claim 1 compounded with carbon black; the improvement wherein said black-containing copolymer is peptized with about 0.5 to 4 parts, per 100 parts of copolymer, of diisopropyl xanthogen disulfide prior to cure.

References Cited

UNITED STATES PATENTS

| 2,234,215 | 3/1941 | Youker | 260—79.5 X |
| 3,190,865 | 6/1965 | Miller | 260—92.3 |
| 3,300,433 | 1/1967 | Apotheker | 260—29.7 |

DONALD E. CZAJA, *Primary Examiner.*

M. J. WELSH, *Assistant Examiner.*